UNITED STATES PATENT OFFICE 2,108,484

1'-CYANINE DYES AND A PROCESS FOR THE PREPARATION THEREOF

Frances Mary Hamer and Nellie Ivy Fisher, Harrow, England, assignors, by mesne assignments, to Eastman Kodak Company, Jersey City, N. J., a corporation of New Jersey No Drawing. Application January 8, 1934, Serial No. 705,818. In Great Britain January 9, 1933

4 Claims. (Cl. 260—41)

This invention relates to new dye intermediates termed 1-halogenoisoquinoline alkyl halides and a process of preparing them, as well as a new series of cyanine dyes termed 1'-cyanine dyes prepared from these intermediates and a process of preparing these cyanine dyes.

It is an object of this invention, therefore, to prepare 1-halogenoisoquinoline alkyl halides. Another object is to prepare 1'-cyanine dyes. A further object is to provide processes of preparing these new compounds.

The 1-halogenoisoquinoline alkyl halides, such as the 1-iodoisoquinoline alkyl iodides, may be prepared, we have discovered, according to the following scheme:

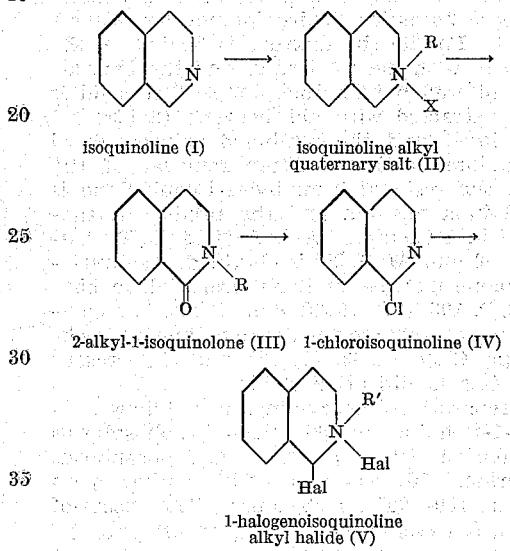

1-halogenoisoquinoline alkyl halide (V)

Isoquinoline (I) is first converted into a quaternary alkyl salt (II) by addition with a compound RX, where R represents an alkyl group and X an acidic radical. For this addition reaction such compounds as methyl p-toluenesulfonate (R= —CH₃, X= —O.SO₂.C₇H₇) or ethyl p-toluenesulfonate (R= —C₂H₅, X= —O.SO₂.C₇H₇)

are suitable. The salt (II) is then oxidized using ice-cold alkaline ferricyanide, when the 2-alkyl-1-isoquinolone (III) is obtained. This compound is then converted into 1-chloroisoquinoline (IV) by treatment with phosphorous pentachloride and phosphorous oxychloride, and in the final stage of the synthesis the 1-halogenoisoquinoline alkyl halide (V) is obtained by heating the 1-chloroisoquinoline (IV) with alkyl halide (R'Hal). 2-methyl- and 2-ethyl-1-isoquinolones were first prepared by Decker (J. pr. Chem., 1893, 47, 28) and the methods given in full below are modifications of his. 1-chloroisoquinoline was described by Gabriel and Colman (Ber., 1900, 33, 980) but our method of preparation differs from theirs and we do not agree with the melting point which they record. The 1-halogenoisoquinoline alkyl halides (V) and the preparation thereof, herein described, are our invention.

The new intermediates (V) are capable of reacting under the influence of alkali with cyclammonium alkyl salts containing a reactive methyl group to yield new cyanine dyes containing the isoquinoline nucleus. Where the methyl group is in the α-position to the quaternary nitrogen atom, the general formula of the resultant dye is

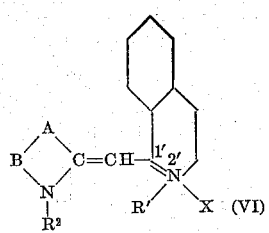

in which A= —CH=CH—(vinylene), S or Se or O or C(alkyl)₂
B=phenylene or substituted phenylene where A=vinylene, S or Se or O or C(alkyl)₂
=naphthylene or substituted naphthylene where A=vinylene or S or Se or O
=vinylene or substituted vinylene where A=S or O
= —CH₂—CH₂— where A=S or Se
R' and R² =alkyl (similar or dissimilar)
X=acidic radical In quaternary alkyl salts of lepidine the reactive methyl group is in the γ-position, and the general formula of the dye is

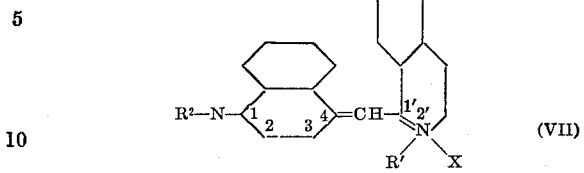

where R', R² and X have the same meaning as before. The rings may be substituted.

In these two structural formulae the acidic radical is shown attached to the nitrogen atom in the isoquinoline nucleus, but this is done for convenience, since the acidic radical is in all probability not bound more firmly to one nitrogen atom than the other, virtual tautomerism having been shown to exist in several classes of cyanine dyes.

The new dyes are named by priming the numerals in the isoquinoline nucleus, as shown, the numerals in the other nucleus being unprimed. The general name of a dye of type VII therefore becomes 1-alkyl-2'-alkyl-4,1'-cyanine salt. The heterocyclic nuclei are numbered in accordance with recognized custom, and conform to the numbering advocated in Richter's Lexikon and used, for instance, in the publications of the Chemical Society of London.

The following is a selection of bases containing reactive methyl groups in the α-position, quaternary alkyl salts of which may, according to our synthesis, be condensed with a 1-halogenoisoquinoline alkyl halide:

Quinaldine
β-naphthoquinaldine
1-methylbenzothiazole
1-methyl-α-naphthothiazole
2-methyl-β-naphthothiazole
1-methylbenzoselenazole
2-methylthiazole
2-methylthiazoline
1-methylbenzoxazole
2-methyl-3:3-dialkylindolenine Substituted derivatives of these bases may of course be employed, such as p-toluquinaldine, 1,5-dimethylbenzothiazole, 2,4-dimethylthiazole.

When salts of quinaldine are employed, the dyes have the following structure

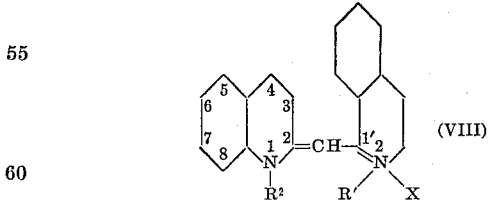

and the general name for such a dye is 1-alkyl-2'-alkyl-2,1'-cyanine salt.

A dye derived from 1-methylbenzothiazole has the structure

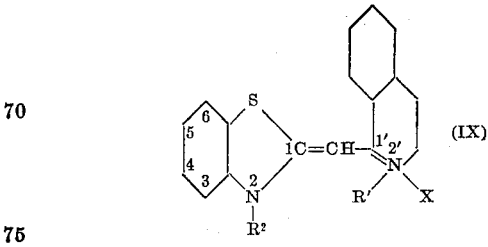

and its general name is 2-alkyl-2'-alkylthia-1'-cyanine salt.

A dye derived from 2,4-dimethylthiazole will have the structure

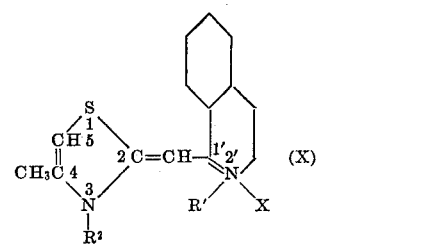

and bears the name 4-methyl-3-alkyl-2'-alkylthiazolo-1'-cyanine salt.

The structures of other dyes described herein will be readily apparent from the foregoing.

The following examples illustrate our invention:

*Example of the preparation of the quaternary salts*

In the preparation of 1-iodoisoquinoline methiodide (V, R'=CH₃, Hal=I) there is first prepared a salt of type II. For example, 50 g. of isoquinoline (1 mol.) and 72 g. of methyl p-toluenesulfonate (1 mol.) are well mixed and heated on the boiling water bath. Solidification is rapid, but heating is continued for an hour. The resulting isoquinoline metho-p-toluenesulfonate is dissolved in warm water (200 cc.) and this solution is slowly added to a mixture of finely powdered potassium ferricyanine (280 g.; 2.2 mols) with a solution of potassium hydroxide (87 g.; 4 mols) in water (200 cc.), which mixture is covered with benzene (2 litres); during the addition, the mixture is cooled with ice. The temperature is then kept below 35° whilst a further quantity of potassium hydroxide powder (800 g.) is added. Finally the mixture is heated on the waterbath, with hand-stirring, and the benzene extract filtered hot on the pump. The solid is further extracted with hot benzene (2 litres, 1 litre, 1 litre) and the combined extracts dried over sodium sulphate. After removal of the solvent, the residual 2-methyl-1-isoquinolone is distilled in a vacuum and the product refractionated in a vacuum. A 62% yield, B. P. 210–220°/40–50 mm. M. P. 35° is obtained. 2-ethyl-1-isoquinolone may be similarly prepared, in 55% yield, B. P. 195–197°/10–20 mm. These two compounds were prepared for the first time by Decker (J. pr. Chem. 1893, 47, 28) and the present method is a modification of his.

We prepare 1-chloroisoquinoline as follows. 2-methyl-1-isoquinolone (60 g.; 1 mol.), phosphorus pentachloride (92 g.; 1.2 mols) and phosphorus oxychloride (100 cc.) are heated together in an oilbath at 150–160° for 28 hours. The excess of phosphorus oxychloride is distilled off and the hot residue poured onto ice. It is then treated with excess of sodium hydroxide and the liberated base is extracted with benzene. The extract is dried over sodium sulphate and the benzene then distilled off. The residue is distilled in a vacuum. In order to remove unchanged 2-methyl-1-isoquinolone, which is not volatile with steam, the product is then steam distilled. The oil is extracted from the distillate with benzene and the extract dried as before. After removal of the benzene, the residue is distilled in a vacuum. It has B. P. 160–170°/20–30 mm., M. P.

23–24° with previous softening, and is obtained in 60% yield. From the residue in the flask after steam distillation, a 13% yield of 2-methyl-1-isoquinolone is recoverable. Although 1-chloroisoquinoline has been described by Gabriel and Colman (Ber. 1900, 33, 980), our method of preparation differs from theirs and we do not agree with the melting point which they record.

The 1-halogenoisoquinoline alkylhalides are prepared by heating the 1-chloroisoquinoline obtained above with alkyl bromides or iodides such as ethyl bromide, methyl iodide, ethyl iodide, n-propyl iodide. The products in these instances are 1-bromoisoquinoline ethobromide, 1-iodoisoquinoline methiodide, 1-iodoisoquinoline ethiodide and 1-iodoisoquinoline n-propiodide respectively. For example, if 1-chloroisoquinoline (1 mol.) and methyl iodide (2.4 mols i. e. a 20% excess) are heated in a sealed tube at 100° for 48 hours and the solid product is washed with acetone to remove the starting materials, the yield of 1-iodoisoquinoline methiodide is 76%. If the two reactants are heated under reflux, two hours is the optimum time of heating, and the yield of purified product is 60%. The other salts are similarly obtained.

*Example 1*

To prepare the dye 1.2′-diethyl-2.1′-cyanine iodide (formula VIII, R′ and $R^2$ = ethyl, X=iodide) 1.82 g. (1 mol.) of quinaldine ethiodide and 2.5 g. (1 mol.) 1-iodoisoquinoline ethiodide are treated in boiling absolute ethyl alcoholic suspension (30 cc. of solvent) with a hot absolute ethyl alcoholic solution of sodium ethylate, made by dissolving 0.31 g. (2.2 atoms, i. e. 10% excess) of sodium in 20 cc. of alcohol, the whole being refluxed and stirred for 20 minutes. The dye which separates is filtered off when cold and extracted with ether and purified by recrystallization from methyl alcohol. The dye forms minute brownish crystals with a green reflex giving a reddish orange solution in methyl alcohol.

By using 1 mol. of 1-iodoisoquinoline methiodide in the above condensation in place of the 1 mol. of 1-iodoisoquinoline ethiodide there employed, there is obtained 1-ethyl-2′-methyl-2.1′-cyanine iodide.

By condensing 1 mol. of p-toluquinaldine ethiodide with 1 mol. of 1-iodoisoquinoline methiodide there is obtained 6.2′-dimethyl-1-ethyl-2.1′-cyanine iodide which gives a pink-orange solution in alcohol and crystallizes in dull red crystals.

By condensing 1 mol. of β naphthaquinaldine ethiodide with 1 mol. of 1-iodoisoquinoline methiodide there is obtained 2′-methyl-1-ethyl-5.6-benzo-2.1′-cyanine iodide which gives a pink solution in alcohol and crystallizes in dark red minute crystals.

By condensing 1 mol. of quinaldine methiodide with 1 mol. of 1-iodoisoquinoline methiodide there is obtained 1.2′-dimethyl-2.1′-cyanine iodide which gives an orange solution in alcohol and crystallizes in dark red crystals.

*Example 2*

In the preparation of 1-ethyl-2′-methyl-4.1′-cyanine iodide, 1 mol. of lepidine ethiodide is substituted for the 1 mol. of quinaldine ethiodide used on the second dye synthesis of Example 1, the reaction being carried out quite similarly. This dye forms a crystalline powder and gives a crimson solution in methyl alcohol.

*Example 3*

In the preparation of 2.2′-diethylthia-1′-cyanine iodide, (Formula IX, R′ and $R^2$=ethyl, X=iodide), 1.86 g. (1 mol.) of 1-methylbenzothiazole ethiodide and 2.5 g. (1 mol.) of 1-iodoisoquinoline ethiodide are boiled and stirred with 100 cc. of absolute ethyl alcohol and a solution of 0.3 g. (2.2 atoms) of sodium in 20 cc. of absolute alcohol added and the whole boiled and stirred for 20 minutes. The dye is filtered off when cold and washed with ether followed by water and after drying a yield of 57% is obtained. The dye may be recrystallized from methyl alcohol (yield 41%).

This dye forms dull reddish crystals which give an orange solution in methyl alcohol.

By condensing 1 mol. of 2-methyl-β-naphthothiazole ethiodide with 1 mol. of 1-iodoisoquinoline methiodide there is obtained 2′-methyl-2-ethyl-3.4 benzthia-1′-cyanine iodide which gives a pink solution in alcohol and crystallizes in dark red crystals.

By condensing 1 mol. of 1-methyl-α-naphthothiazole ethiodide with 1 mol. of 1-iodoisoquinoline methiodide there is obtained 2′-methyl-2-ethyl-5.6 benzothia-1′-cyanine iodide which gives a pink solution in alcohol and recrystallizes in brown crystals.

By condensing 1 mol. of 1-methyl benzothiazole ethiodide with 1 mol. of 1-iodoisoquinoline n-propiodide there is obtained 2-ethyl-2′-n-propyl thia-1′-cyanine iodide which gives an orange solution in alcohol and recrystallizes in red crystals.

By condensing 1 mol. of 1-methyl-5 chlorobenzo thiazole ethiodide with 1 mol. of 1-iodoisoquinoline ethiodide there is obtained 5-chloro-2.2′-diethylthia-1′-cyanine iodide which gives an orange solution in alcohol and crystallizes in red crystals having a green reflex.

By condensing 1 mol. of 1-methyl-benzoselenazole ethiodide with 1 mol. of 1-iodoisoquinoline methiodide there is obtained 2′-methyl-2-ethyl-selena-1′-cyanine iodide which gives an orange solution in alcohol and crystallizes in dull red crystals.

Again, if 2.4-dimethylthiazole ethiodide (1 mol.) is employed, there is obtained 3-ethyl-4.2′-dimethylthiazolo-1′-cyanine iodide. This dye forms a reddish brown powder and gives an orange solution in methyl alcohol.

Instead of using sodium ethylate in the condensations given in the foregoing examples, sodium hydroxide or potassium hydroxide, or triethylamine may be used. Absolute ethyl alcohol is preferred as solvent, but the reactions also proceed in the presence of water.

*Example 4*

By condensing 1 mol. of 2-methyl thiazoline methiodide with 1 mol. of 1-iodoisoquinoline ethiodide in the presence of triethylamine there is obtained 3-methyl - 2′ - ethyl thiazolino - 1′ - cyanine iodide which gives a yellow-orange solution in alcohol and crystallizes in yellow and red crystals.

By condensing 1 mol. of 1-methyl benzoxazole ethiodide with 1 mol. of 1 - iodoisoquinoline ethiodide in the presence of triethylamine there is obtained 2.2′-diethyloxa-1′-cyanine iodide which gives a yellow-orange solution in alcohol and crystallizes in yellow crystals tinged orange.

By condensing 1 mol. of 2.3.3-trimethylindolenine methiodide with 1 mol. of 1-iodoisoquinoline ethiodide in the presence of triethylamine there is obtained 1.3.3-trimethyl-2′-ethyl-indo-1′-cyanine iodide which gives a yellow orange solution in alcohol and crystallizes in orange crystals.

The herein disclosed compounds are dyes and can be employed in coloring textiles, e. g. cellulose acetate textiles, and in the preparation of light filters. The dyes show some photographic sensitizing action, though the action is not strong.

It should be noted that the herein disclosed compounds are capable of existing in two forms, illustrated for example, as follows:

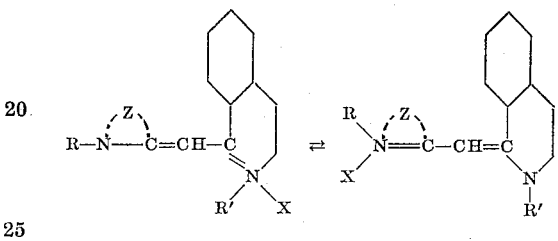

wherein Z represents the non-metallic atoms necessary to complete a heterocyclic nucleus, such as a thiazole, a thiazoline, a benzooxazole, a benzothiazole, a benzoselenazole, a 3,3-dialkylindolenine, a naphthothiazole or a quinoline nucleus. As indicated the two forms are interconvertible, i. e. the two forms are virtual tautomers. The dye derived from lepidine quaternary salts are likewise capable of existing in two forms, as follows:

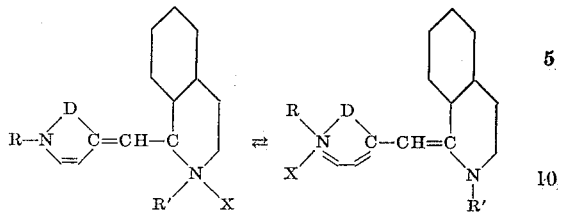

wherein D represents a phenylene group and R, R′ and X have the values indicated above.

What we claim as our invention and desire to secure by Letters Patent of the United States is:

1. A 1′-cyanine dye of the following structure:

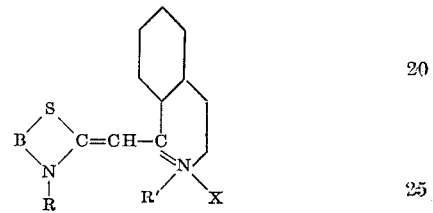

wherein R and R′ represent alkyl groups, X represents an acid radical and B represents a phenylene group.

2. A 2-alkyl-2′-alkylthia-1′-cyanine salt.
3. A 2-alkyl-2′-alkylthia-1′-cyanine iodide.
4. 2,2′-diethylthia-1′-cyanine iodide.

FRANCES MARY HAMER.
NELLIE IVY FISHER.